United States Patent [19]

Funada et al.

[11] Patent Number: 4,521,080

[45] Date of Patent: * Jun. 4, 1985

[54] FIELD EFFECT MODE LIQUID CRYSTAL DISPLAY

[75] Inventors: Fumiaki Funada, Tenri; Keiichiro Shimizu, Kyoto, both of Japan

[73] Assignee: Sharp Kabushiki Kaisha, Osaka, Japan

[*] Notice: The portion of the term of this patent subsequent to Nov. 11, 1997 has been disclaimed.

[21] Appl. No.: 432,660

[22] Filed: Oct. 18, 1982

Related U.S. Application Data

[63] Continuation of Ser. No. 925,783, Jul. 18, 1978, abandoned, which is a continuation of Ser. No. 592,225, Jul. 1, 1975, Pat. No. 4,232,947.

[30] Foreign Application Priority Data

Jul. 1, 1974 [JP] Japan ................................. 49-75689

[51] Int. Cl.³ .............................................. G02F 1/13
[52] U.S. Cl. ................................................... 350/341
[58] Field of Search ............................... 350/334, 341

[56] References Cited

U.S. PATENT DOCUMENTS

| 3,941,454 | 3/1976 | Maezawa | 350/334 |
| 3,967,883 | 7/1976 | Meyerhofer et al. | 350/341 |
| 4,232,947 | 11/1980 | Funada et al. | 350/341 |

OTHER PUBLICATIONS

Raynes, "Improved Contrast Uniformity in Twisted Nematic Liquid Crystal Electro Optic Display Devices," *Electronics Letters*, vol. 10, pp. 141–142 (May 2, 1974).

*Primary Examiner*—John K. Corbin
*Assistant Examiner*—Richard Gallivan
*Attorney, Agent, or Firm*—Birch, Stewart, Kolasch & Birch

[57] ABSTRACT

A nematic-phase liquid crystal material is sandwiched between two opposing parallel plates at least one of which is transparent. The two parallel plates are respectively coated with transparent electrode films having parallel micro-groove structures at the respective inner surfaces in contact with the nematic-phase liquid crystal material established by unidirectional rubbing. In particular, an additional or second micro-groove structure is further provided for said fist-named micro-groove structure which has an asymmetric or anisotropic profile along the longitudinal axes of the respective micro-grooves within the first micro-groove structure, preferably of a substantially saw-tooth profile. This combination results in a surface anisotropy in solid geometry rather than in plane geometry in the interfacial surfaces. The surface anisotropies in the two interfacial surfaces should be established in a complemental relationship in a manner to attain uniform aligment of liquid crystal molecules and hence to reduce free energy due to the liquid crystal molecules, therefore, non-uniformity of display is alleviated.

4 Claims, 16 Drawing Figures

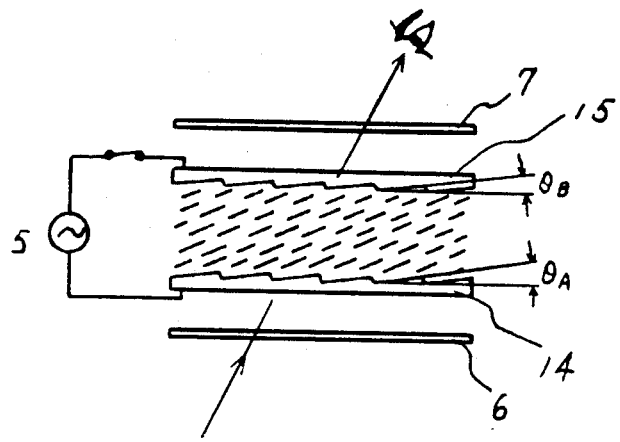
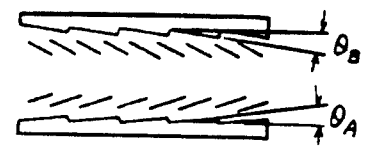
FIG. 6            FIG. 7
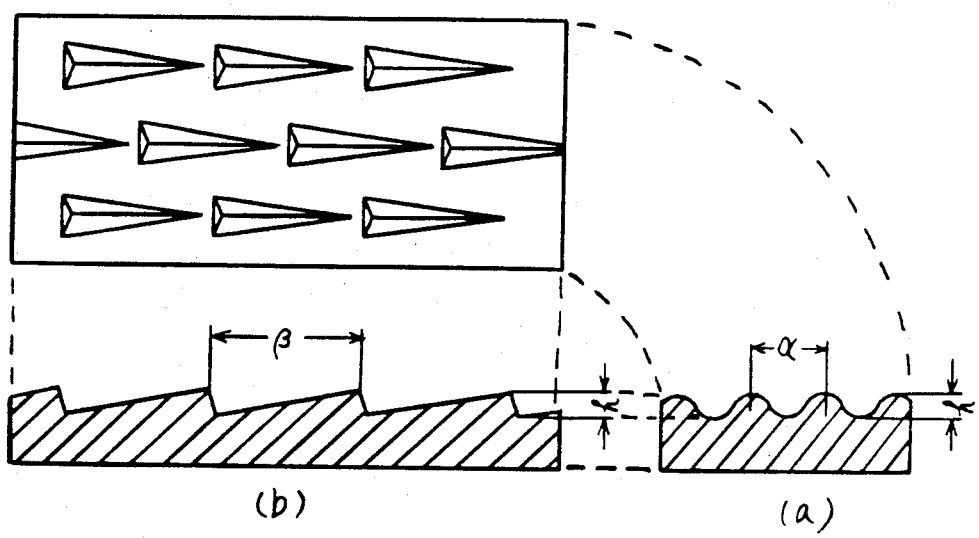
FIG. 4

(b)

(d)

(a)

(c)

FIELD EFFECT MODE LIQUID CRYSTAL DISPLAY

This application as a continuation of copending application Ser. No. 925,783, filed on July 18, 1978, abandoned, which was a continuation of application Ser. No. 592,225, now U.S. Pat. No. 4,232,947.

The present invention relates generally to a field effect mode liquid crystal display cell, and more particularly to interfacial surface structures of two opposing plates supporting a layer of liquid crystal material therebetween.

It is well known in the liquid crystal display that preorientation of a nematic-phase liquid on the walls of the cell attains much higher contrast in light intensity between the quiescent and active states of the nematic cell. More specifically, in the electro-optical cell comprising a layer of the nematic-phase liquid crystal material supported between two glass plates whose inner surfaces are coated with transparent electrodes, such coated electrodes are rubbed with a cloth or filter paper so that the liquid crystal layer becomes oriented along the direction of rubbing. See, for example, U.S. Pat. No. 3,625,591 granted to Marvin J. Freiser and Ivan Haller, Chappaqua and U.S. Pat. No. 3,731,986 granted to James L. Fergason. Nevertheless, it has been found that non-uniformity of contrast in light intensity exists even when employing such unidirectional rubbing technology.

It is, therefore, a primary object of the present invention to provide an improved liquid crystal display cell capable of providing a much higher degree of uniformity in visual indication in a relatively wide range of observation angles.

Other objects and many of the attendant advantages of the present invention will be readily appreciated as the same becomes better understood by reference to the following detailed description which considered in conjunction with the accompanying drawings in which like reference numerals designate like parts throughout the figures thereof, and wherein:

FIG. 4 is an enlarged view showing a typical example of an interfacial surface structure constructed in accordance with teachings of the present invention;

Figure 13:
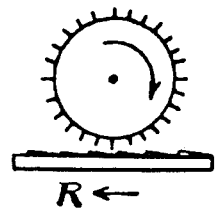
Figure 12:

FIGS. 5(a)-5(d) cross sectional views showing various forms of the interfacial surface structures in accordance with the present invention;

FIG. 6 is a schematic view showing an embodiment of a liquid crystal cell wherein alignment of molecules is homogeneous;

FIG. 7 is a schematic view showing a liquid crystal cell not embodying the present invention for comparison with FIG. 6;

FIGS. 8 through 11 are schematic views showing another embodiment wherein molecule alignment exhibits a twisted nematic structure;

FIGS. 12 and 13 are schematic views showing the fabrication processes for establishing the interfacial surface structure of the present invention.

Figures 1, 2:
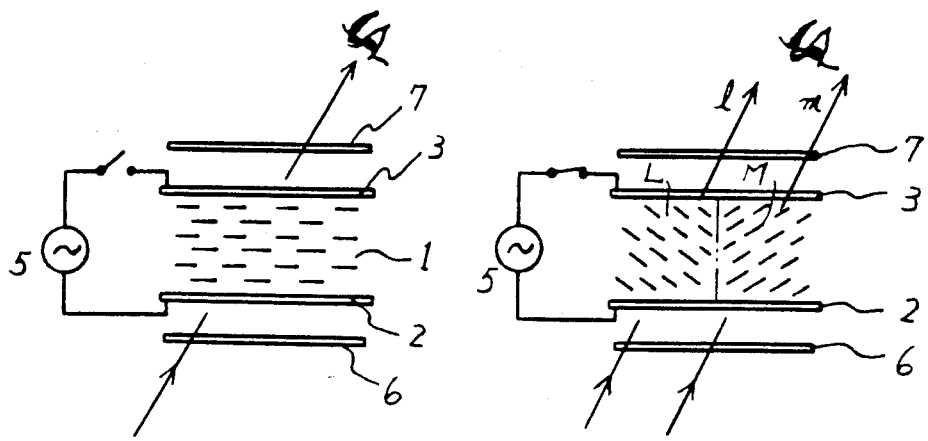
FIGS. 1 through 3 are views showing the prior art liquid crystal display cell.
Figure 3:
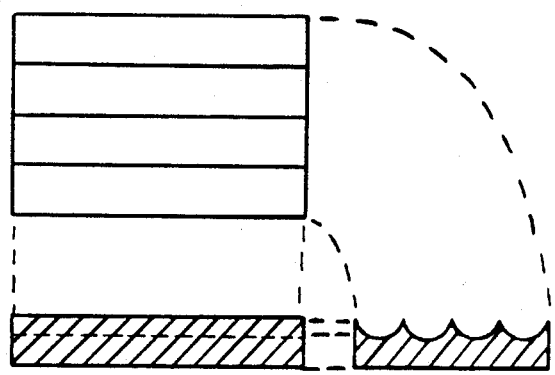

Before proceeding with a discussion of the new and novel interfacial surfaces of the present invention, it may be of advantage to briefly discuss the prior are liquid crystal display cell and its associated attendant disadvantages with reference to FIGS. 1 through 3, for the purpose of facilitating understanding of the principle of the present invention.

In conventional field effect mode liquid crystal displays non-uniformly in display contrast exists when the strength of an applied electric field is small. FIG. 1 shows a liquid crystal cell of the light transmission type when no electric field is applied, while FIG. 2 shows the same when an electric field is applied. FIG. 3 depicts, in the schematic enlarge form, an interfacial surface structure, or a micro-groove structure in the conventional devices.

As is well known, a layer 1 of a nematic-phase liquid crystal material having a positive dielectric anisotropy is sandwiched between two opposing parallel plates 2 and 3 at least one of which has good light transmissive characteristics. The plates 2 and 3 have plane opposed parallel inner faces on which are entirely or partially deposited electrically conductive electrodes, although not shown in the drawings. The both electrodes are connected with a voltage supply 5 via a switch. Secured to the outer surfaces of each parallel plates 2 and 3 are crossed polarizers 6 and 7.

As taught by the above referenced United States Patents, the inner surfaces of the plates 2 and 3 in contact with the liquid crystal layer 1 are rubbed with cloth or leather in the same direction so that such interfacial surfaces exhibit a so-called micro-groove structure as shown by FIG. 3, which consists of a multiplicity of parallel strips. Such micro-groove structure permits all the molecules of the liquid crystal to exhibit homogeneous alignment in the direction of rubbing.

When the electric field is established across the liquid crystal display cell, the molecules in the liquid crystal material are inclined in the direction of the electric field, keeping some degrees of angle $\theta$ with respect to the inner surfaces of the plates 2 and 3. Since the molecules in the liquid crystal have no nature of voluntary polarization as found out in ferroelectric materials under these circumstances, there is a mixture of the molecules L accompanying the inclination $\theta$ and the molecule M accompanying the inclination $-\theta$. In other words, two types of the molecule alignment exist in a degeneration fashion. However, the existance of such mixed state of the liquid crystal is much difficult because its inner energy potential is considerably high and unstable. In fact, the respective regions accompanying the alignments L and M may exist independent from each other, as is viewed in the case of magnetic domains. Upon arrival of incident light a mixture of the alignments L and M permits different double refraction behaviors l and m from the incident light. This serves as a major factor causing non-uniformity of display, for example, such as irregularities in color, contrast, etc.

The present invention is made possible by analysis of the non-uniformity phenomenon of the above described type. The present invention may provide a surface structure of two parallel plates supporting a layer of liquid crystal material to eliminate the degeneration states of the liquid crystal molecules. It is the gist of the present invention that an additional or second micro-groove structure is further provided for the first micro-groove structure, the additional structure having an asymmetric or anisotropic profile more preferably a substantially saw-tooth profile.

For purposes of the present invention, the micro-groove structure is defined as a structure which consists of a multiplicity of micro-grooves having the depth of 10Å through 10,000Å (1Å—$10^{-8}$ cm) for the purpose of regulating or defining the alignment of the liquid crystal molecules. Each of the micro-grooves may be of either the concave section or of the convex section from the conception of the present invention.

FIG. 4 shows on an enlarged scale a typical surface structure of the plates for comparison with FIG. 3. The first micro-groove structure, as shown in FIG. 4(a) section, comprises strips or grooves of 10 Å–1,000Å deep (h) and 10Å–10,000Å wide (α), each having a substantially symmetrical shape with respect to its center. As suggested by FIG. 4(b) section, one of preferred forms of the second groove structure is formed by establishing a substantially asymmetric saw-tooth profile at the interfacial surfaces in contact with the nematic-phase liquid crystal layer. This provides a surface anisotropy in solid geometry. It will be understood that such surface anisotropy is statistical rather than perfect and exact. The illustrative saw-tooth shape has the depth h of 10Å–1,000Å and the pitch β of 10Å–10,000Å.

Figure 5:
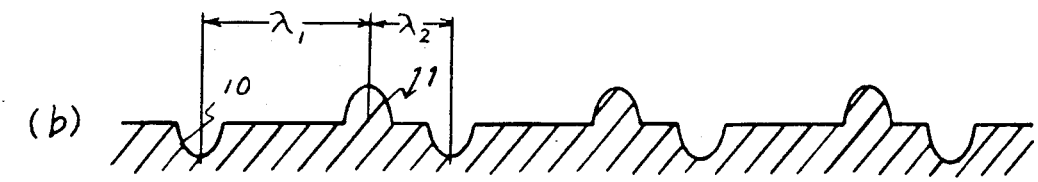
Figure 5:
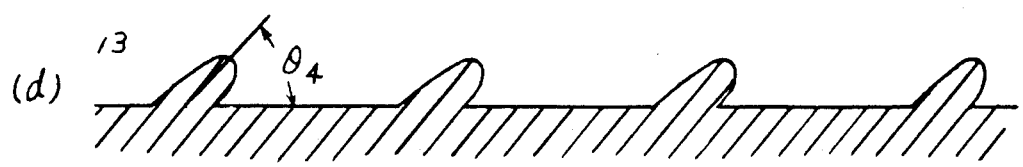
Figure 5:
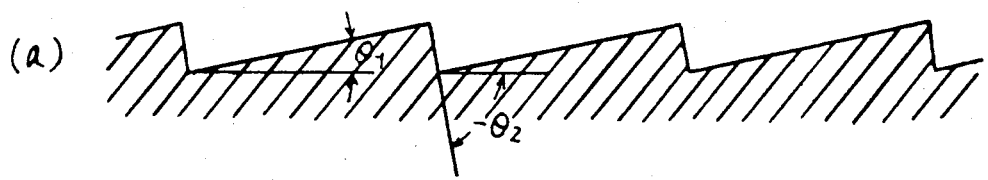
Figure 5:
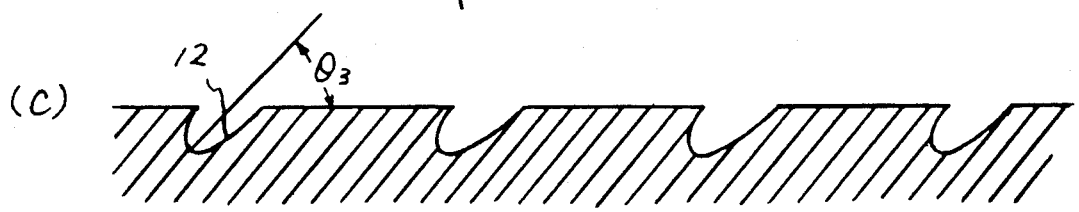

FIG. 5 illustrates some examples of the asymmetric or anisotropic saw-tooth profile. Although varying depending upon the fabrication methods thereof, the respective shapes will give satisfactory results in the function of the present invention. The surface anisotropy shown in FIG. 5(a) section consists of a succession of saw-teeth having a gentle inclination $\theta_1$ and a sharp inclination $-\theta_2$. FIG. 5(b) section consists of an alternate arrangement of recessions 10 spaced the distance $\delta_1$ from protrusions 11 which are spaced the distance $\delta_2$ from the next recession 10, etc., as shown. FIG. 5(c) section shows a succession of equally spaced recessions 12 with an inclination $\theta_3$, whereas FIG. 5(d) shows a succession of equally spaced protrusions 13 with an inclination $\theta_4$.

The following sets forth a field effect mode liquid crystal display cell employing the two substrate plates having the groove structure constructed in accordance with teachings of the present invention, wherein the molecules in the liquid crystal material align in a homogeneous fashion. The groove structure is illustrated in the enlarged diagram in FIG. 6. The first groove structures at the interfacial surfaces of the rear plate 14 and the front plate 15 are held in a parallel relationship. In addition, in connection with the second groove structure the gentle inclination $\theta_A$ of the saw-tooth profile of the rear plate 14 should coincide with that $\theta_B$ of the front plate 15 (i.e. $\theta_B \approx \theta_A$). FIG. 7 illustrates a liquid crystal cell werein the above requirement is not satisfied (i.e. $\theta_B \approx -\theta_A$).

In the embodiment shown in FIG. 6, when an electric field is developed across the both electrodes, all the molecules in the liquid crystal material will align along the gentle inclination of the saw-tooth profile within the second groove structure such that the degeneration as appeared in the prior art is avoided. In other words, the surface anisotropies and hence the inclinations of the saw-tooth profiles in the two interfacial surfaces should be established in a complemental relationship to reduce free energy within the liquid crystal material.

Figure 8:
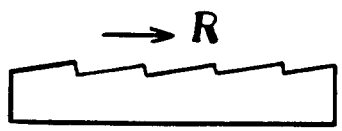

For simplicity of explanation the direction of asymmetry or anisotropy within the second groove structure is designated by the vector R as shown in FIG. 8. Pursuant to such ruling, the vector $R_1$ of the rear plate 14 of FIG. 6 is opposite to the vector $R_2$ of the front plate 15.

The principle of the present invention is applicable to a liquid crystal display cell wherein molecules align with a twisted nematic structure. It is well known in the art that the direction of the molecule alignment is twisted degree by degree from the rear plate to the front plate and the direction of twisting is either right-handed or left-handed. It is further obvious that addition of optically active materials for example, such as cholesterol derivative, alcohol derivative or amido derivative to the nematic-phase liquid crystal material affords right-handed or left-handed twisted properties thereto. It is customary that the twisted angle is selected to be 90°.

Figures 9, 10:
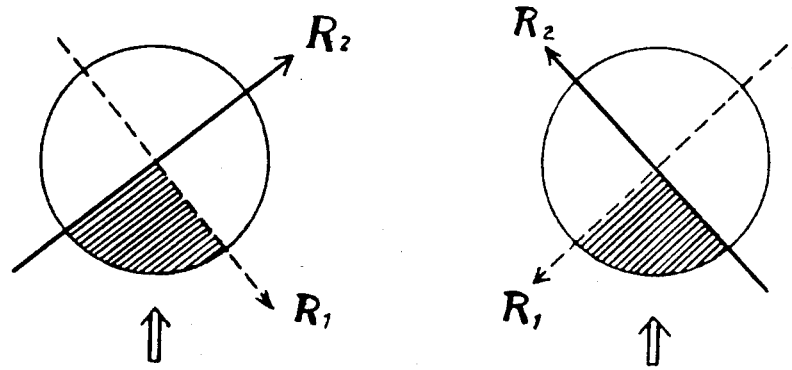

FIG. 9 illustrates the relationship between the surface anisotropy or vector of the second groove structure and the most favorable observation angle in the case of the right-hand twisted nematic liquid crystal cell. If the vector $R_1$ of the second groove structure in the rear plate is right downward, the vector $R_2$ of the front plate should be selected right upward. A region marked by oblique lines represents an obversable range. Similarly, FIG. 10 illustrates the left-hand twisted nematic liquid crystal cell. It is a matter of importance for display purpose that the observable direction is definite differing from the conventional liquid crystal display.

Figure 11:
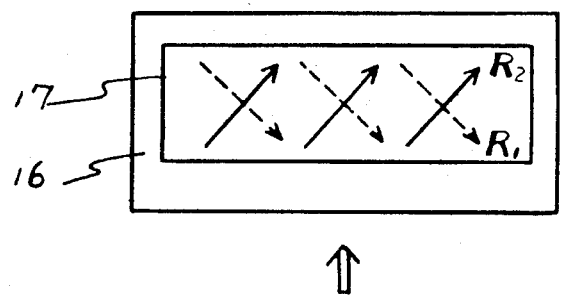

FIG. 11 shows how to apply the special interfacial surface structure of the present invention to a right-hand twisted nematic alignment liquid crystal cell.

On the rear plate 16 there is the first micro-groove structure obliquely right downward established as viewed by dot lines, while the vector of the second groove structure thereof is selected in the right downward direction as designated by $R_1$. On the front plate 17 the first micro groove structure is established obliquely right upward as shown by solid lines and the vector or anisotropy of the second groove structure is selected right upward as designated by $R_2$.

Some ways of fabricating or establishing the interfacial surface structure of the present invention will be described finally with reference to FIGS. 12 and 13. As set forth above, it is obvious that the first micro-groove structure is made by unidirectionally rubbing the inner surfaces of the substrate plates with cloth or the like. A method shown in FIG. 12 consists of obliquely depositing through the use of vacuum evaporation technique employing materials such as SiO. FIG. 13 shows an alternate method consisting unidirectional rotation of a drum provided at its peripheral surface with fine abrasives and stroking the inner surfaces of the substrate plates in union with the drum rotation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid crystal display cell including a layer of liquid crystal material sandwiched between a pair of opposing parallel plates each carrying an electrode coating, said liquid crystal display cell further comprising:

a first micro groove structure consisting of a multiplicity of grooves provided at the interfacial surface of the electrode coating in contact with the liquid crystal layer for defining the direction of the liquid crystal molecules in the liquid crystal layer in the plane of said interfacial surface; and a second micro groove structure of a multiplicity of substantially saw-tooth micro grooves at the interfacial surface of the electrode coating in contact with the liquid crystal layer, said substantially saw-tooth micro grooves having a profile for defining the inclination of the liquid crystal molecules in the liquid crystal layer with respect to said plane of said interfacial surface.

2. The liquid crystal display cell according to claim 1, wherein said second micro groove structure is superimposed on said first micro groove structure.

3. A liquid crystal display cell comprising:
first and second opposing plates each carrying an electrode coating;
a layer of liquid crystal material sandwiched between said first and said second plates;
a first micro groove structure of a multiplicity of micro grooves provided at both the interfacial surfaces of said first and said second opposing plates in contact with the liquid crystal layer for defining the direction of the alignment of the liquid crystal molecules in the liquid crystal layer in the planes of said interfacial surfaces; and
a second micro groove structure of a multiplicity of substantially saw-tooth micro grooves on both the interfacial surfaces of said first and said second opposing plates in contact with the liquid crystal layer;
said substantially saw-tooth micro grooves having a profile for defining the inclination of the alignment of the liquid crystal molecules with respect to said planes of said interfacial surfaces in the liquid crystal layer;
said second micro groove structure at the interfacial surface at the first plate having an inclination angle which is equal to that at the second plate.

4. A twisted nematic liquid crystal display cell comprising:
first and second opposing plates each carrying an electrode coating;
a layer of liquid crystal material sandwiched between said first and said second plates;
a first micro groove structure of a multiplicity of grooves provided at both the interfacial surfaces of said first and said second opposing plates in contact with the liquid crystal layer for defining the direction of the alignment of the liquid crystal molecules in the liquid crystal layer in the planes of said interfacial surfaces, said first micro groove structure at the first plate being positioned at a right angle with said first micro groove structure at the second plate for twisting the alignment of the liquid crystal molecules; and
a second micro groove structure of a multiplicity of substantially saw-tooth micro grooves on both the interfacial surfaces of said first and said second opposing plates in contact with the liquid crystal layer;
said substantially saw-tooth micro grooves having a profile for defining the inclination of the alignment of the liquid crystal molecules with respect to said planes of said interfacial surfaces in the liquid crystal layer;
said second micro groove structure at the interfacial surface at the first plate having an inclination angle which is equal to that at the second plate.

* * * * *